(12) United States Patent
Neill et al.

(10) Patent No.: US 9,681,169 B1
(45) Date of Patent: Jun. 13, 2017

(54) SYSTEM FOR HIGHLY PREDICTABLE PERFORMANCE OF SET-TOP BOXES USING DOWNLOADABLE CONDITIONAL ACCESS

(71) Applicant: CSC HOLDINGS, LLC, Bethpage, NY (US)

(72) Inventors: Richard Neill, Syosset, NY (US); Ken Silver, Plainview, NY (US); Robert Clyne, Rockville Centre, NY (US)

(73) Assignee: CSC Holdings, LLC, Bethpage, NY (US)

( * ) Notice: Subject to any disclaimer, the term of this patent is extended or adjusted under 35 U.S.C. 154(b) by 107 days.

(21) Appl. No.: 14/471,296

(22) Filed: Aug. 28, 2014

Related U.S. Application Data

(60) Provisional application No. 62/027,561, filed on Jul. 22, 2014.

(51) Int. Cl.
*H04N 21/418* (2011.01)
*H04N 21/254* (2011.01)
*H04N 21/4627* (2011.01)
*H04N 21/442* (2011.01)

(52) U.S. Cl.
CPC ..... *H04N 21/4181* (2013.01); *H04N 21/2541* (2013.01); *H04N 21/44236* (2013.01); *H04N 21/4627* (2013.01)

(58) Field of Classification Search
CPC ........... H04N 21/4181; H04N 21/2541; H04N 21/44236; H04N 21/4627
See application file for complete search history.

(56) References Cited

U.S. PATENT DOCUMENTS

| 2003/0023661 | A1* | 1/2003 | Clohessy | G06F 9/5016 718/104 |
| 2006/0020950 | A1* | 1/2006 | Ladd | H04L 63/10 719/328 |
| 2008/0022371 | A1* | 1/2008 | Chen | H04L 9/004 726/4 |
| 2008/0098212 | A1* | 4/2008 | Helms | H04L 63/0428 713/155 |
| 2009/0210912 | A1* | 8/2009 | Cholas | H04N 5/4401 725/82 |
| 2010/0131959 | A1* | 5/2010 | Spiers | G06F 9/50 718/105 |
| 2011/0271276 | A1* | 11/2011 | Ashok | G06F 9/5077 718/1 |
| 2013/0152180 | A1* | 6/2013 | Nair | H04L 63/0823 726/6 |
| 2015/0163206 | A1* | 6/2015 | McCarthy | G06F 21/6227 713/171 |

* cited by examiner

*Primary Examiner* — Chenea Smith
(74) *Attorney, Agent, or Firm* — Sterne, Kessler, Goldstein & Fox P.L.L.C.

(57) ABSTRACT

Providing a conditional access system (CAS) to a set-top box is described. An example method includes encapsulating a CAS application in a NCAS (Next CAS) container, and objects associated with the CAS application are executed in the NCAS container. Resources for the CAS application and other applications running on the set-top box are pre-allocated so that each application has a pre-fixed resource allocation upon startup of the set-top box. An execution of the CAS application is validated using a linked chain of trust.

20 Claims, 5 Drawing Sheets

SYSTEM FOR HIGHLY PREDICTABLE PERFORMANCE OF SET-TOP BOXES USING DOWNLOADABLE CONDITIONAL ACCESS

BACKGROUND

Modern cable service providers offer a wealth of services and content to their subscribers, using a set-top box (STB) located in the subscriber's home. The STB tunes, filters, and demodulates television and other signals transmitted from the cable provider. Due to the fact that successive copies of digital content can be duplicated and redistributed with no loss of quality, digital television content is especially vulnerable and easily subject to theft.

In response to the high risk of service and content theft, cable service providers implement proprietary content theft protection and usage right enforcement systems, which are generally referred to as "Conditional Access Systems" (CAS) to control access to the services and content for their customers. According to The Telecommunications Act of 1996, FCC further requires that CAS meet basic rules of support for separable security, integration ban and common reliance. Some conventional systems use a downloadable Java Condition Access System (JCAS) approach, such as an Open Media Security JCAS (OMS JCAS), to satisfy the core regulatory requirements. However, the JCAS systems suffer from performance contention issues.

For example, by the nature of Java Virtual Machine (JVM) environments, any stack dependent process can temporarily consume all available JVM application resources, which place the JCAS application within the JVM on hold until the resources are made available again. This is unsuitable for the STBs because they are expected to perform many critical functions within tight time constraints. CAS applications are one of these, thus they need to function on schedule to prevent visible impairments in video content delivery and display. Typically, unpredictable response times in CAS functions are perceived by the customers as unacceptable and as harbingers of systemic failure. Further, video content is streamed to STBs in a continuous encrypted data flow and the keys used to encrypt video are frequently changed. STB CAS systems need to respond rapidly enough to sense the key change and provide information needed to support the key transition interval to prevent a short term failure in decryption. Due to the resource contention of the JCAS environment, decryption transition failures are impossible to completely prevent in normal set top operations. As a result, conventional systems fail to provide a downloadable CAS with deterministic resource management and optimal performance.

BRIEF DESCRIPTION OF THE DRAWINGS/FIGURES

Embodiments are described, by way of example only, with reference to the accompanying drawings. In the drawings, like reference numbers generally indicate identical or functionally similar elements. The drawing in which an element first appears is typically indicated by the leftmost digit or digits in the corresponding reference number.

DETAILED DESCRIPTION

Provided herein are system, method and/or computer program product embodiments, and/or combinations and sub-combinations thereof, for providing downloadable Conditional Access Systems (CAS) to set-top boxes (STBs). The Next Conditional Access System (NCAS) described herein provides deterministic resource management. As will be described in further detail below, embodiments implement pre-allocated resources for the CAS application and any other application running on the STBs, thus eliminate the resource contention issue encountered in conventional systems such as JCAS. Embodiments further implement a NCAS container to support the portability requirement of CAS for readily downloading and installation of CAS module among multiple STBs and for secure deactivation and recycling, so that the devices using NCAS may be recovered for re-use and refurbishment.

Embodiments provide trust validation and secure execution via a linked chain of trust anchored in or associated with the hardware component of the STBs. Embodiments allow new applications to be added to the STBs without the need of re-tuning and re-integration, as long as each application is running within the predetermined resource limit. Accordingly, NCAS meets the core requirements of portability, trust validation and secure section with predictable performance.

Figure 1:
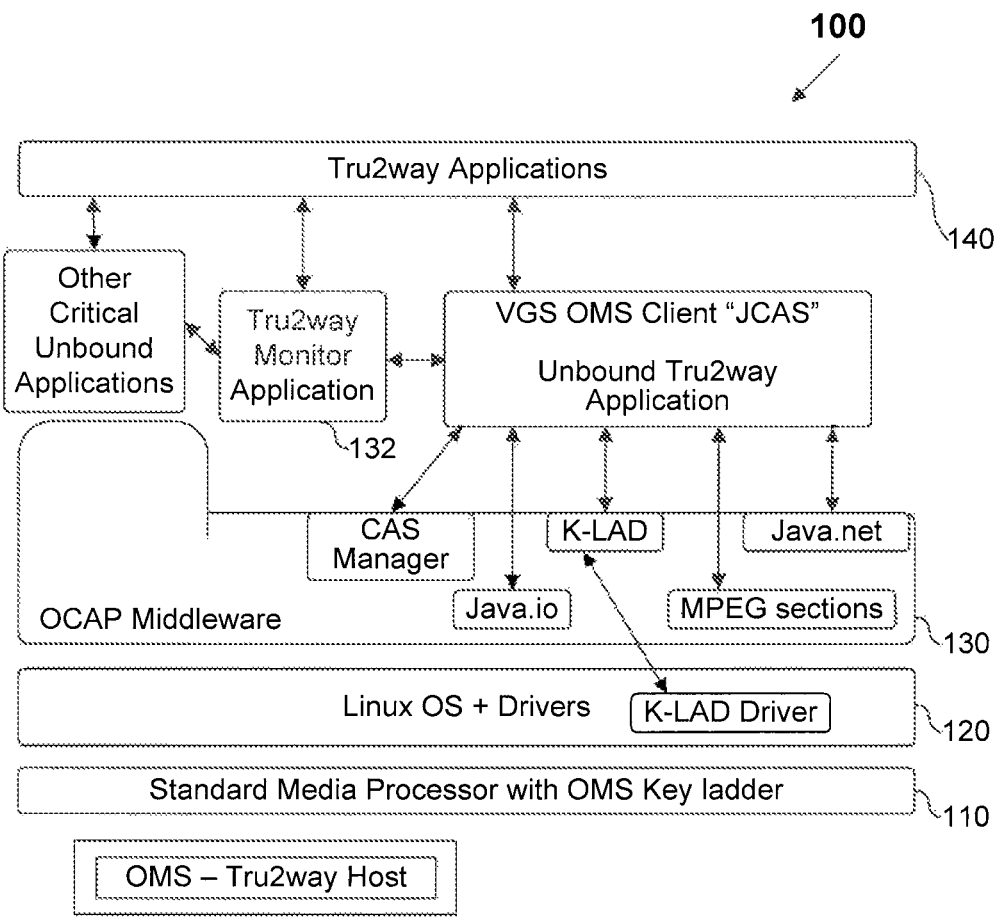
FIG. 1 illustrates a Java Conditional Access System (JCAS).

FIG. 1 illustrates a Java Conditional Access System (JCAS). In this example, JCAS is shown in an OMS Java environment, such as Tru2Way, but is not intended to be limited thereto. System 100 includes a standard media processor with OMS key ladder 110, a Linux OS and drivers layer 120, which has a key ladder driver installation, a OCAP middleware layer 130 and Tru2Way applications layer 140.

The Java Virtual Machine (JVM) in the OCAP middleware layer 120 is the environment that supports the execution of the applications. OCAP middleware layer 120 is a state machine responsible for tasks such as booting the STB up, turning the cable modem on/off, creating channel lineup information, which are defined in the OCAP standard. OpenCable Application Platform, or OCAP, is an operating system layer designed for consumer electronics that connect to a cable television system, the Java-based middleware portion of the platform. OCAP is designed to be a multi-vendor protocol. For example, a TV manufacturer A may build a TV according to OCAP standard. Under the OMS JCAS architecture, a cable company may produce programs that can be loaded into TV's JVM manufactured by A with the corresponding applications running in the JVM.

As shown in FIG. 1, the JCAS code objects work in a JVM environment as a co-equal partner with all other JAVA/Tru2Way software processes, the CAS manager, the K-LAD (key ladder) interfaces, the monitor application 132, the unbound Try2Way application and other critical unbound applications. Because resources are needed to maintain the proper function of the JAVA/Tru2Way stack, and the OS and Drivers layer 120 cannot be controlled from applications running inside the JVM, the resources within the JVM are initialized and regulated by the Monitor application 132. Thus, any critical stack dependent process can temporarily consume all available JVM application resources, which may place the applications within the JVM on hold until the resources are made available again. The resource contention originated by competing applications or processes within the JVM may cause performance degradation for JCAS applications hosted on the STBs.

However, STBs are especially vulnerable for such performance degradation. First, STBs are expected to perform a large number of functions within tight time constraints. Functions such as remote control processing, channel changes, generation of on-screen graphics and graphics navigation are expected to be smooth and predictable. Unpredictable response times are typically perceived by device users as unacceptable and as harbingers of systemic failure.

Second, CAS functionality further requires that it works within tight time constraints. For example, CAS needs to function on schedule to prevent visible impairments from occurring in delivering video content.

Third, performance degradation also impacts decryption on the STBs. Video content may be streamed to STBs in a continuous encrypted data flow. In order to maintain the standards of systemic security, the keys used to encrypt video are frequently changed. Set-top CAS systems need to work rapidly enough to sense the key change and provide information needed to support the key transition interval to prevent a short term failure in decryption. As a result, decryption transition failures are easily detected and are considered by the device users as unacceptable defects in normal set-top operations.

Because the OMS JCAS software is deliberately placed in a JVM, where resource availability cannot be guaranteed, JCAS architecture may lead to unacceptable rates of failures and higher levels of complaints about video quality. Although this problem can be ameliorated through careful tuning of resource management controls, it cannot be eliminated. The problem is exacerbated when current trends in the evolution of video content distribution are heading towards increasingly complex product delivery models, which places increasing demands on the operation of set-top general purpose processors. Consequently, the need to fine tune resource allocation in the JCAS architecture with each successive addition of new products makes software development harder to accomplish and drives up the time needed to test and debug each new software product.

Besides the competing applications running in parallel with the JCAS process in the JVM, the JVM runs in a higher priority independently from these applications. Accordingly, the JVM itself has the potential to consume the resources at a much higher priority than the applications, and there is no guarantee of resources for the JCAS process.

Furthermore, to guarantee the security and integrity of the systems, monitor application 132 controls what other applications may be running on the JVM, in addition to the JCAS application. For example, the Tru2way application and other critical unbound applications are also controlled by the monitor application 132. Since the monitor application is also running on the JVM, it may further compete with JCAS application for JVM resources.

Figure 2:
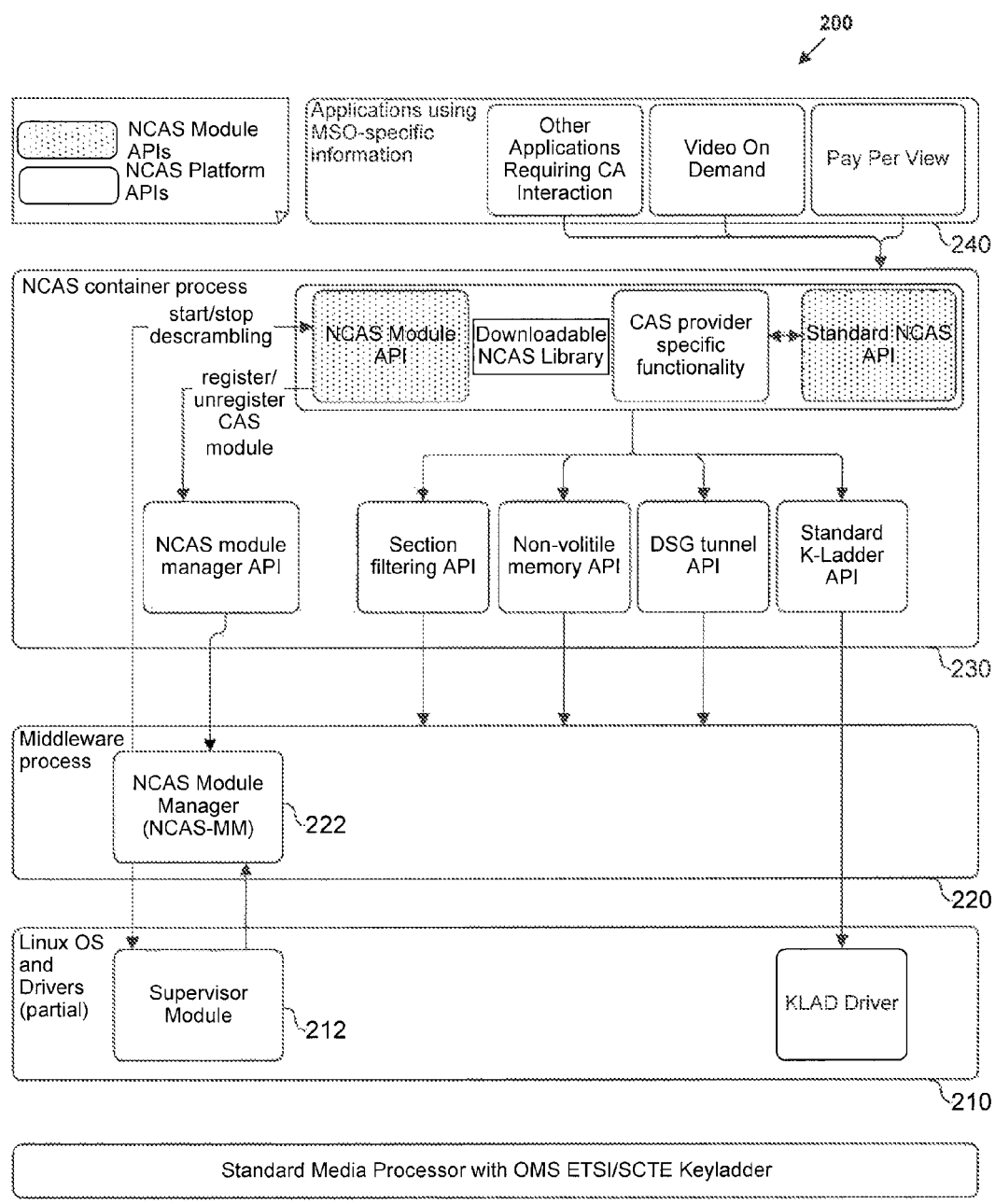
FIG. 2 illustrates a Next-generation or Next Conditional Access System (NCAS), according to an embodiment.

FIG. 2 illustrates a Next Conditional Access System (NCAS) 200, according to an embodiment. NCAS is designed to address the issues of JCAS noted above. FIG. 2, system 200 includes the OS and Drivers layer 210, which hosts supervisor module 212, the middleware process layer 220, which hosts NCAS module manager 222, NCAS container process layer 230, and application layer 240 which hosts applications such as video On Demand, Pay Per View and other applications that interact with Standard NCAS API on the NCAS container process layer 230. The STBs are configured to receive the NCAS, which may be downloaded to the STBs.

In an embodiment, system 200 may be implemented using a self-contained environment using programming language such as C, where the applications hosted within this environment may not be allowed to run and request resources on the fly. Instead, when the codes for the NCAS application are executed, the NCAS application may be given a specific resource designed for the NCAS application, based on a plan for pre-allocating resources pet application. The NCAS application runs independently of any other applications, such as supervisor module 212, NCAS module manager 222, the K-ladder driver, or any processes or applications running in OS and driver layer 120, in middleware process layer 220, in the NCAS container process layer 230, or anywhere in the STB. Thus, the resource contention problem may be eliminated, because resources are allocated for each component deterministically as the STB is turned on.

In an embodiment, NCAS container 230 may optionally create and launch a virtual machine solely and specifically for the objects associated with the NCAS application. In typical usage the NCAS client will run as illustrated in FIG. 2. The process of downloading NCAS application may be controlled by a download manager called DAL manager (not shown) located in middleware process layer 220. The DAL manager may control the import of the full NCAS application. When the STB is turned on for the first time, a hardware component on the STB called boot-loader may first download the OS and driver code image, which in turn launches the DAL manager. The DAL manager may make specific requests to preprogrammed and pre-allocated system resources, such as the server, memory, file systems etc. DAL manager may look for these resources and import corresponding files and components, including the module manager, and load them into memory and execute them. As the NCAS module manager launches, it calls back the DAL manager, and requests for the NCAS application.

In an embodiment, when the request to get the NCAS application is received, the NCAS application is loaded into and executed in the NCAS container. Thus, when the STB turns on for the first time and it lacks the NCAS application, the DAL manager may control the download of the NCAS application. Once the NCAS application is downloaded, the next time the box is booted up, the DAL manager checks if the application has changed and downloads an updated version if necessary.

In an embodiment, to download the NCAS application on a different STB, the process repeats and the NCAS application to be downloaded is the same among the STBs. Thus, the NCAS container may provide standardization and portability of NCAS application among various STBs.

In an embodiment, the download manager may be running in the background. For example, while the user is watching TV and the download manager detects the change to the NCAS application, such as a change in the menu feature. The download manager may shutdown the corresponding menu component/application, download the new menu feature and backup the menu application. This process may be transparent to the user, without interruption to the TV program. In another embodiment, updating menu features may need rebooting of the STB.

In an embodiment, NCAS container may include other applications or processes that need connections to the resources in the STB. For example, application specific libraries and standard APIs may reside inside the container. The Standard APIs may allow the newly downloaded NCAS application module to make requests to the STB to obtain a network connection. The NCAS client then sends continuous stream of commands through the network connection to the STB. For example, in one of such command, the NCAS client may request 15% of the modem. In another example, through the DSG (DOCSIS) tunnel API, the client may request a continuous one-way path open to the STB to securely transmit information. Those requests may be bound within the resource limits of the NCAS container for each application that is attached.

Module manager 222 may register/unregister NCAS module in the NCAS application. Module manager 222 may mediate the calls to various APIs in NCAS container (such as the section filtering API, non-volatile memory API, DSG tunnel API and standard K-Ladder API) and give permissions to the APIs to be used. In some embodiments, module manager 222 may serve as a control of traffic going into/out of the NCAS container and ensure that the applications do not cause detrimental effect to the STB. The NCAS applications may be developed from multiple vendors independently from the manufacturers of the STBs. The communication between supervisor module 212 and the NCAS container may go through module manager 222 as an intermediate.

In one embodiment, as a new application is being added to the NCAS container, there is no need to re-tune the applications (such as the NCAS library) to accommodate the change. Because each application has a pre-fixed resource allocation, as long as the applications are running within their resource limits, there is no need to retune the resource allocation. The architect or designer of NCAS applications may decide to use less of the total resources of the STBs. Through this pre-allocation resource management scheme, changes of the NCAS client such as addition of a new application may not require a complete re-integration or re-check of the system.

Figure 3:
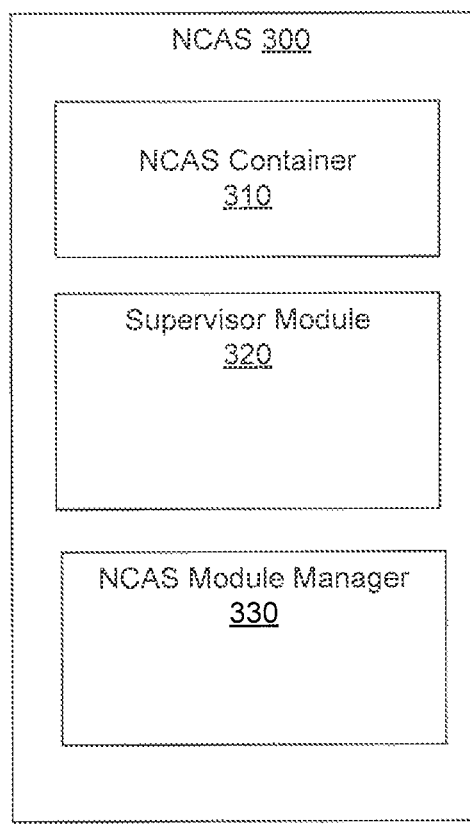
FIG. 3 illustrates an example NCAS, according to an embodiment.

FIG. 3 illustrates elements of NCAS 300, according to an embodiment. In the example shown in FIG. 3, NCAS 300 includes a NCAS container 310, a supervisor module 320 and a NCAS module manager 330.

NCAS container 310 is configured to encapsulate a CAS application, wherein objects associated with the CAS application are executed in the NCAS container. En an embodiment, NCAS container 310 may create and launch a self-contained environment that serves as a virtual machine solely and specifically for the objects associated with the NCAS application. In another embodiment, NCAS container 310 may include other applications such as applications or processes corresponding to section filtering API, the non-volatile memory API, the DSG tunnel API and standard K-ladder API. The NCAS application may encompass processes or components such as NCAS module API, implementing the downloadable NCAS library; and the standard NCAS API, which may implement CAS provider specific functionalities (as illustrated in FIG. 2). The standard NCAS API may interact with Video On Demand, Pay Per View and other applications using Multi-System Operator (MSO) specific information.

In an embodiment, NCAS container supports the functionality that meets the portability requirement. For example, a NCAS application may be readily and securely shared between interested retail device manufacturers and may be implemented in a way that allows a retail NCAS device to be portable between different cable systems without the need to change the device software or hardware. In another embodiment, the retail device may be autonomous to allow the NCAS device to be initialized on any qualified cable system with minimal customer intervention. The NCAS container implements portability in that, for example, a TV manufacturer such as Samsung builds a TV and wants it to be used with Cablevision's programming. Samsung may obtain a running copy of the download manager and NCAS container on the TV, which may in turn find a NCAS client and download it to the TV. A NCAS client may be subsequently up and running in the NCAS container on the TV. NCAS container may also provide an extra layer of trust between the STB and the programs to be executed on the STB.

Supervisor module 320 is configured to pre-allocate resources for the CAS application and other applications running on the STB, and each of the CAS applications and the other applications has a pre-fixed resource allocation upon startup of the STB. For example, supervisor module 320 pre-allocates resources for each application in NCAS container and a NCAS client executed in NCAS container cannot get more or less than the resources that supervisor module 320 has allocated to it, thus eliminating any guess work in the memory management scheme.

In an embodiment, because resources allocated to the applications are in a predetermined fashion, starting/stopping other applications may not impact how NCAS applications run. For example, deleterious resource contention issues between security software element (NCAS) and other software elements for customer interface, such as, program guide, etc. may be eliminated. Thus, resources are made available to all other features and functions of the NCAS device deterministically, so that all critical performance parameters can be expressly tuned to provide highly predictable response times.

In an embodiment, supervisor module 320 is configured to further validate an execution of the CAS application using a linked chain of trust. For example, supervisor module 320 may regulate and enforce the secure and authenticated download of the download manage (e. g. the DAL manager) that in turn regulates and enforces the download of the separable CAS element (such as the NCAS client) that may be executed using standard defined interfaces.

In an embodiment, the program execution environment written in a programming language such as C, is intrinsically permissive. The execution of the supervisor module 320, DAL manager, NCAS Container and NCAS Client may be linked to a hardware chain of trust. Such chain of trust may be anchored in a secure boot-loader (explained below) and a unified code image. For example, the hardware chain of trust may be associated with and invoked by the secure boot-loader.

In an embodiment, The STB may be a closed proprietary work space. There may be secure mechanisms that prevent breaking into the STB and installing an application without proper permission, thus preventing interception of service, or damaging the system caused by detrimental commands. The starting of the STB may initiate a fixed sub-routine, called boot-loader, which is non-editable and burned-in at the time of manufacture. In an embodiment, the boot-loader may be encrypted, and it may validate certain hardware resources. For example, the boot-loader may validate the OS and Driver layer, including the supervisor module. Likewise, the codes to be installed in the STB may be wrapped in another layer of encryption. After the supervisor module is validated and running, the supervisor module may in turn validate the download manager and NCAS container In an embodiment, supervisor module 320 may enforce the continuance of the chain of trust to allow the NCAS client to be downloaded, securely validated using PKI and symmetric encryption and securely executed. For example, a NCAS client may be listed in a DAL manger Manifest and compiled to match the specific tool chain anchored in or associated with the CPU or main system on chip (SOC) in order to be downloadable to a retail NCAS device. A NCAS application in term may be executed properly if its internal validation systems are appropriately activated by the supervisor module/DAL manager trust chain. In an embodiment, the DAL manager, NCAS container and NCAS client can be delivered on insecure networks because of the trust linkage, once they are compiled to match the tool chain embedded in the CPU of an approved NCAS device.

In an embodiment, supervisor module 320 is further configured to launch and validate the dynamic application loading manager (such as the DAL manager) to obtain launch parameters for a NCAS client, which is configured to validate and download the NCAS module manager.

In an embodiment, NCAS module manager 330 is configured to mediate a set of specific standardized APIs for the NCAS application. For example, NCAS module manager 330 controls a set of specific standardized APIs in an OMS NCAS stack. In an embodiment, the assembly of NCAS container 310, supervisor module 320, and NCAS module manager 330 into a system both meets core regulatory requirements for STBs, and provides a deterministic type of resource management.

Figure 4:
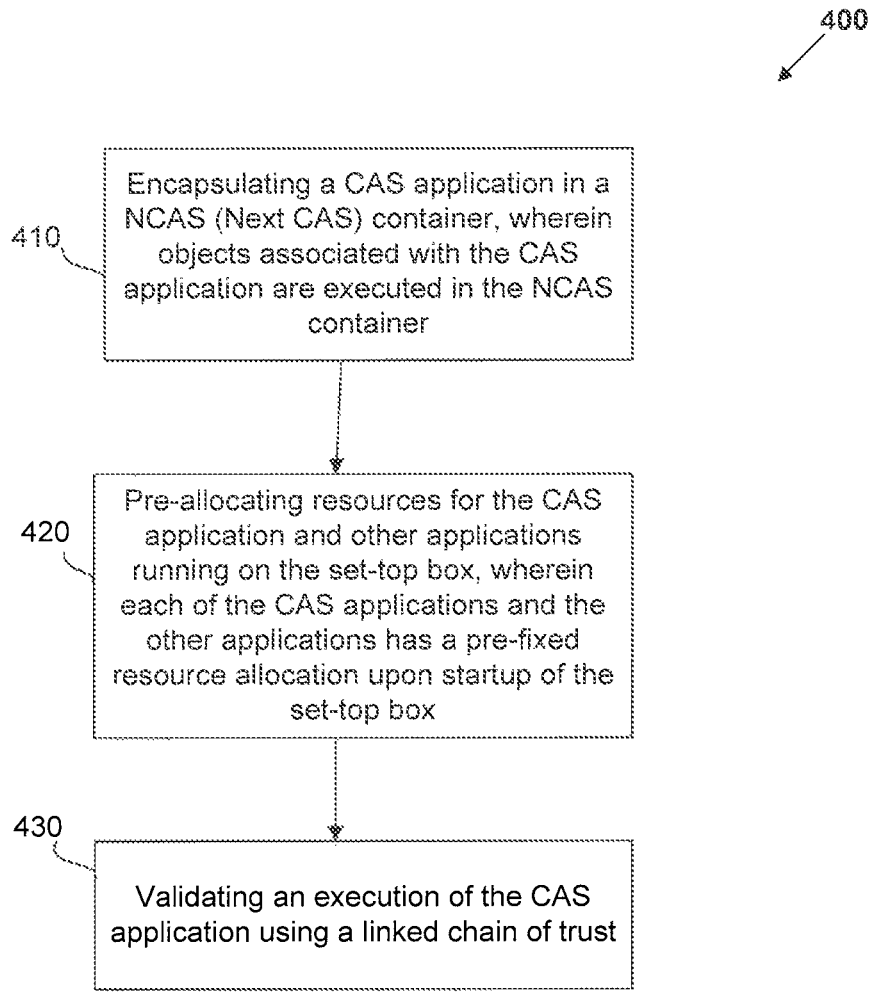
FIG. 4 is a flowchart for a method for providing downloadable CAS for a set-top box, according to an embodiment.

FIG. 4 is a flowchart for a method for providing downloadable CAS for a STB, according to an embodiment. For ease of explanation, method 400 will be described with respect to NCAS elements illustrated in FIG. 3, as described above. However, method 400 is not limited thereto.

At stage 410, a CAS application is encapsulated in a NCAS container, and objects associated with the CAS application are executed in the NCAS container. For example, the CAS application is encapsulated in NCAS container 310.

In an embodiment, the CAS element provides theft protection and usage right enforcement of service and content delivered on the STB. In another embodiment, given that a NCAS client may be downloadable to the STB, the NCAS container implements the portability functionality of the STB.

In an embodiment, the CAS element may include processes or components such as NCAS module API, implementing the downloadable NCAS library. The CAS element may further include the standard NCAS API, which implements CAS provider specific functionalities.

In an embodiment, the other applications may be executed inside the NCAS container. For example, the other applications may include applications providing API such as section filtering API, the non-volatile memory API, the DSG tunnel API and standard K-ladder API (as illustrated in FIG. 2.) In another embodiment, the other applications may be executed outside the NCAS container and interface with the NCAS application. For example, the other applications may include Video On Demand, Pay Per View and other applications using Multi-System Operator (MSO) specific information. Such other applications may interact with the NCAS application via the standard NCAS API.

At stage 420, resources for the CAS application and other applications running on the STB are pre-allocated, so that each of the CAS applications and the other applications has a pre-fixed resource allocation upon startup of the STB. For example, supervisor module 320 pre-allocates resources for the CAS application and other applications running on the STB.

At stage 430, an execution of the CAS application is validated using a linked chain of trust. For example, supervisor module 320 validates the execution of the CAS application using a linked chain of trust.

In an embodiment, the linked chain of trust is anchored in or associated with a hardware component such as a system on chip (SOC) of the STB. When a third party writes a NCAS application to be installed on the STB, the new NCAS application may need to be validated through the chain of trust. The third party may not turn on the STB and request for resources unless it is trusted by the boot-loader, the OS and driver layer and the supervisor module. In this example, the corresponding boot-loader, the OS and driver layer, the supervisor module, the NCAS container or the NCAS may constitute a linked chair of trust.

In an embodiment, after the validation of the linked chain of trust are passed through the supervisor module, the NCAS container, and the NCAS, a challenge-response based authentication mechanism, such as using a ETSI key ladder, provides an additional layer of security by sending a challenge to the NCAS application to be validated. If equipped with the proper key, the NCAS application may generate a proper response for the challenge and be validated. The validation utilizing the ETSI key ladder challenge response mechanism and the NCAS standard APIs may be mediated by the NCAS module manager.

Embodiments shown in FIGS. 1-4, or any part(s) or function(s) thereof, may be implemented using hardware, software modules, firmware, tangible computer readable media having instructions stored thereon, or a combination thereof and may be implemented in one or more computer systems or other processing systems.

Figure 5:
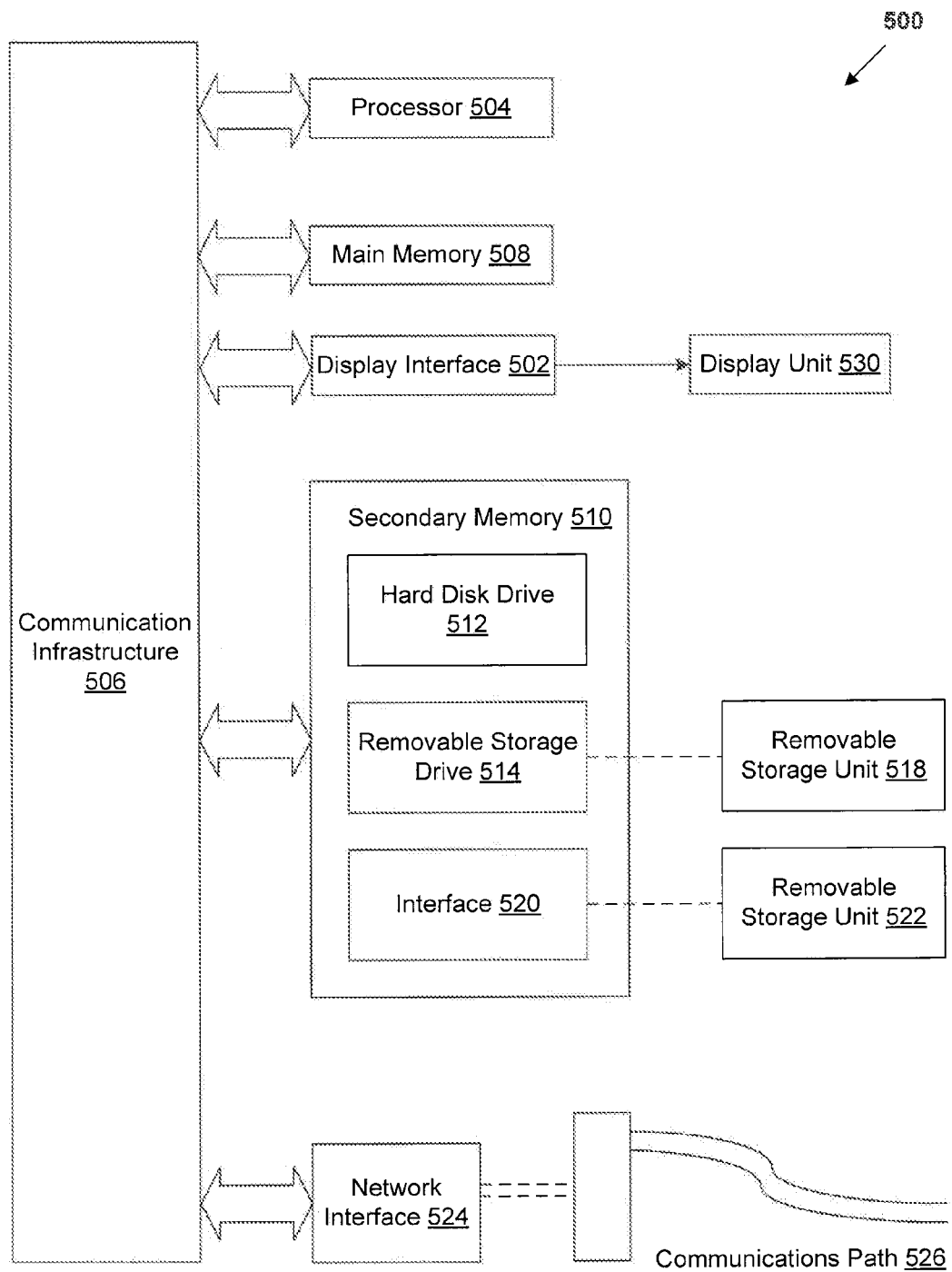
FIG. 5 is a diagram of an example computer system in which embodiments can be implemented.

FIG. 5 illustrates an example computer system 500 in which embodiments, or portions thereof, may be implemented as computer-readable code. For example, a NCAS, including its components, as shown in FIGS. 2 and 3, can be implemented in computer system 500 using hardware, software, firmware, tangible computer readable media having instructions stored thereon, or a combination thereof and may be implemented in one or more computer systems or other processing systems. Hardware, software, or any combination of such may embody any of the modules and components in FIGS. 1-4.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computer linked or clustered with distributed functions, as well as pervasive or miniature computers that may be embedded into virtually any device.

For instance, at least one processor device and a memory may be used to implement the above described embodiments. A processor device may be a single processor, a plurality of processors, or combinations thereof. Processor devices may have one or more processor "cores."

Various embodiments are described in terms of this example computer system 500. After reading this description, it will become apparent to a person skilled in the relevant art how to implement embodiments of the invention using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 504 may be a special purpose or a general purpose processor device. As will be appreciated by persons skilled in the relevant art, processor device 504 may also be a single processor in a multi-core/multiprocessor system, such system operating alone, or in a cluster of computing devices operating in a cluster or server farm. Processor device 504 is connected to a communication infrastructure 506, for example, a bus, message queue, network, or multi-core message-passing scheme.

Computer system 500 also includes a main memory 508, for example, random access memory (RAM), and may also include a secondary memory 510. Secondary memory 510 may include, for example, a hard disk drive 512, removable storage drive 514. Removable storage drive 514 may comprise a floppy disk drive, a magnetic tape drive, an optical disk drive, a flash memory, or the like. The removable storage drive 514 reads from and/or writes to a removable storage unit 518 in a well-known manner. Removable storage unit 518 may comprise a floppy disk, magnetic tape, optical disk, etc. which is read by and written to by removable storage drive 514. As will be appreciated by persons skilled in the relevant art, removable storage unit 518 includes a computer usable storage medium having stored therein computer software and/or data.

In alternative implementations, secondary memory 510 may include other similar means for allowing computer programs or other instructions to be loaded into computer system 500. Such means may include, for example, a removable storage unit 522 and an interface 520. Examples of such means may include a program cartridge and cartridge interface (such as that found in video game devices), a removable memory chip (such as an EPROM, or PROM) and associated socket, and other removable storage units 522 and interfaces 520 which allow software and data to be transferred from the removable storage unit 522 to computer system 500.

Computer system 500 may also include a network interface 524. Network interface 524 allows software and data to be transferred between computer system 500 and external devices. Network interface 524 may include a modem, a network interface (such as an Ethernet card), a communications port, a PCMCIA slot and card, or the like. Software and data transferred via network interface 524 may be in the form of signals, which may be electronic, electromagnetic, optical, or other signals capable of being received by network interface 524. These signals may be provided to network interface 524 via a communications path 526. Communications path 526 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 518, removable storage unit 522, and a hard disk installed in hard disk drive 512. Computer program medium and computer usable medium may also refer to memories, such as main memory 508 and secondary memory 510, which may be memory semiconductors (e.g. DRAMs, etc.).

Computer programs (also called computer control logic) are stored in main memory 508 and/or secondary memory 510. Computer programs may also be received via network interface 524. Such computer programs, when executed, enable computer system 500 to implement embodiments as discussed herein. In particular, the computer programs, when executed, enable processor device 504 to implement the processes of embodiments of the present invention, such as the stages in the methods illustrated by flowcharts 400 of FIG. 4, discussed above. Accordingly, such computer programs represent controllers of the computer system 500. Where embodiments are implemented using software, the software may be stored in a computer program product and loaded into computer system 500 using removable storage drive 514, interface 520, and hard disk drive 512, or network interface 524.

Embodiments of the invention also may be directed to computer program products comprising software stored on any computer useable medium. Such software, when executed in one or more data processing device(s), causes a data processing device(s) to operate as described herein. Embodiments of the invention employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nano-technological storage device, etc.), and communication mediums (e.g., wired and wireless communications networks, local area networks, wide area networks, intranets, etc.).

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also alternative embodiments may perform functional blocks, steps, operations, methods, etc. using orderings different than those described herein.

References herein to "an embodiment," "one embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A method for providing a conditional access system (CAS) to control access to services and content delivered to a set-top box, the method comprising:
   encapsulating a CAS application in a Next CAS (NCAS) container, wherein objects associated with the CAS application are executed in the NCAS container;
   pre-allocating resources for the CAS application and other applications running on the set-top box, wherein the pre-allocated resources for the CAS application are specified independently of the other applications, and wherein each of the CAS application and the other applications has a pre-fixed resource allocation upon startup of the set-top box; and
   validating an execution of the CAS application using a linked chain of trust.

2. The method of claim 1, further comprising:
   downloading the CAS application to the set-top box.

3. The method of claim 1, further comprising:
   associating the linked chain of trust with a hardware component of the set-top box.

4. The method of claim 3, further comprising:
   associating the linked chain of trust with a system on chip (SOC) of the set-top box.

5. A set-top box comprising a conditional access system (CAS) for providing control of access to services and content delivered to the set-top box, comprising:
   a Next CAS (NCAS) container configured to encapsulate a CAS application, wherein objects associated with the CAS application are executed in the NCAS container; and
   a supervisor module configured to:
      pre-allocate resources for the CAS application and other applications running on the set-top box to have a pre-fixed resource allocation upon startup of the set-top box, and
      specify the pre-allocated resources for the CAS application independently of the other applications.

6. The set-top box of claim 5, wherein the supervisor module is further configured to validate an execution of the CAS application using a linked chain of trust.

7. The set-top box of claim 5, wherein the set-top box is configured to receive the CAS application.

8. The set-top box of claim 5, further comprising:
   an NCAS module manager configured to mediate a set of Application Programming Interfaces (APIs) of the CAS application.

9. The set-top box of claim 6, wherein the linked chain of trust is associated with a hardware component of the set-top box.

10. The set-top box of claim 6, wherein the linked chain of trust is associated with a system on chip (SOC) of the set-top box.

11. The set-top box of claim 5, further comprising:
   a secure boot-loader configured to validate and to download an operating system (OS) and driver layer which hosts the supervisor module.

12. The set-top box of claim 5, further comprising:
   a dynamic application download manager configured to validate and to download an NCAS module manager.

13. The set-top box of claim 5, wherein execution of the supervisor module, the NCAS container and an NCAS client is linked to a hardware chain of trust anchored in a secure boot-loader.

14. The set-top box of claim 5, wherein the supervisor module is further configured to launch and to validate a dynamic application loading manager to obtain launch parameters for an NCAS client.

15. The set-top box of claim 5, wherein the supervisor module is configured to implement a deterministic memory management scheme.

16. The set-top box of claim 5, wherein the NCAS container is configured to provide portability among different set-top boxes.

17. The set-top box of claim 6, further comprising:
   a key ladder challenge response mechanism configured to validate.

18. A non-transitory computer readable storage medium having instructions encoded thereon, execution of which, by a processor, cause the processor to perform operations for providing a conditional access system (CAS) to a set-top box, the operations comprising:
   encapsulating a CAS application in a Next CAS (NCAS) container, wherein objects associated with the CAS application are executed in the NCAS container;
   pre-allocating resources for the CAS application and other applications running on the set-top box, wherein the pre-allocated resources for the CAS application are specified independently of the other applications, and wherein each of the CAS application and the other applications has a pre-fixed resource allocation upon startup of the set-top box; and
   validating an execution of the CAS application using a linked chain of trust.

19. The method of claim 1, further comprising:
   downloading a second CAS application to be executed in the NCAS container; and
   pre-allocating resources for the second CAS application without re-tuning the pre-allocated resources of the CAS application and the other applications.

20. The set-top box of claim 15, wherein the CAS application is configured to run independently of the other applications according to its pre-allocated resources, and
   wherein the deterministic memory management scheme is configured to prevent the CAS application from requesting additional resources during runtime.

* * * * *